(12) United States Patent
Zhou

(10) Patent No.: US 8,293,394 B2
(45) Date of Patent: Oct. 23, 2012

(54) BATTERY COVER LATCHING MECHANISM

(75) Inventor: Sheng-Tao Zhou, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 653 days.

(21) Appl. No.: 12/550,846

(22) Filed: Aug. 31, 2009

(65) Prior Publication Data

US 2010/0239898 A1  Sep. 23, 2010

(30) Foreign Application Priority Data

Mar. 21, 2009 (CN) .......................... 2009 1 0301024

(51) Int. Cl.
*H01M 2/04* (2006.01)

(52) U.S. Cl. ....................................... 429/100; 292/137

(58) Field of Classification Search ............ 429/96–100; 455/575.1–575.8; 361/600; 292/16, 17, 292/137

See application file for complete search history.

(56) References Cited

U.S. PATENT DOCUMENTS

2009/0303668 A1* 12/2009 Zhao et al. ............... 361/679.01

* cited by examiner

*Primary Examiner* — Maria J Laios

(74) *Attorney, Agent, or Firm* — Altis Law Group, Inc.

(57) ABSTRACT

A battery cover latching mechanism is provided. The battery cover latching mechanism includes a body member, a battery cover, and a button mounted on the body member. The body member defines a battery receiving space and includes a latching block. The battery cover is placed on the body member to cover the battery receiving space, the battery cover includes a clamp. The button resists the clamp and slides between a first position and a second position. When the button is at a first position, the clamp is released from the latching block. When the button slides from the first position to the second position, the button resists the clamp to move towards the latching block and then latch with the latching block.

14 Claims, 8 Drawing Sheets

BATTERY COVER LATCHING MECHANISM

BACKGROUND

1. Technical Field

The present disclosure relates to battery cover latching mechanisms and, particularly, to a battery cover latching mechanism used in a portable electronic device.

2. Description of Related Art

Batteries are used to provide power to portable electronic devices, e.g., mobile phones. Battery cover latching assemblies are usually provided to secure battery within portable electronic devices.

A typical battery cover latching assembly for an electronic device usually includes a battery cover and latching means, e.g., a locking pin latching into a locking hole. The battery cover can be detachably mounted to a housing of portable electronic devices using the latching means.

However, removal of the battery cover may require a strong force, which may damage the locking pin.

Therefore, there is room for improvement within the art.

BRIEF DESCRIPTION OF THE DRAWINGS

Many aspects of the battery cover latching mechanism can be better understood with reference to the following drawings. These drawings are not necessarily drawn to scale, the emphasis instead being placed upon clearly illustrating the principles of the present battery cover latching mechanism. Moreover, in the drawings like reference numerals designate corresponding sections throughout the several views.

DETAILED DESCRIPTION

The present battery cover latching mechanism is suitable for portable electronic devices, e.g., mobile phones.

Figure 1:
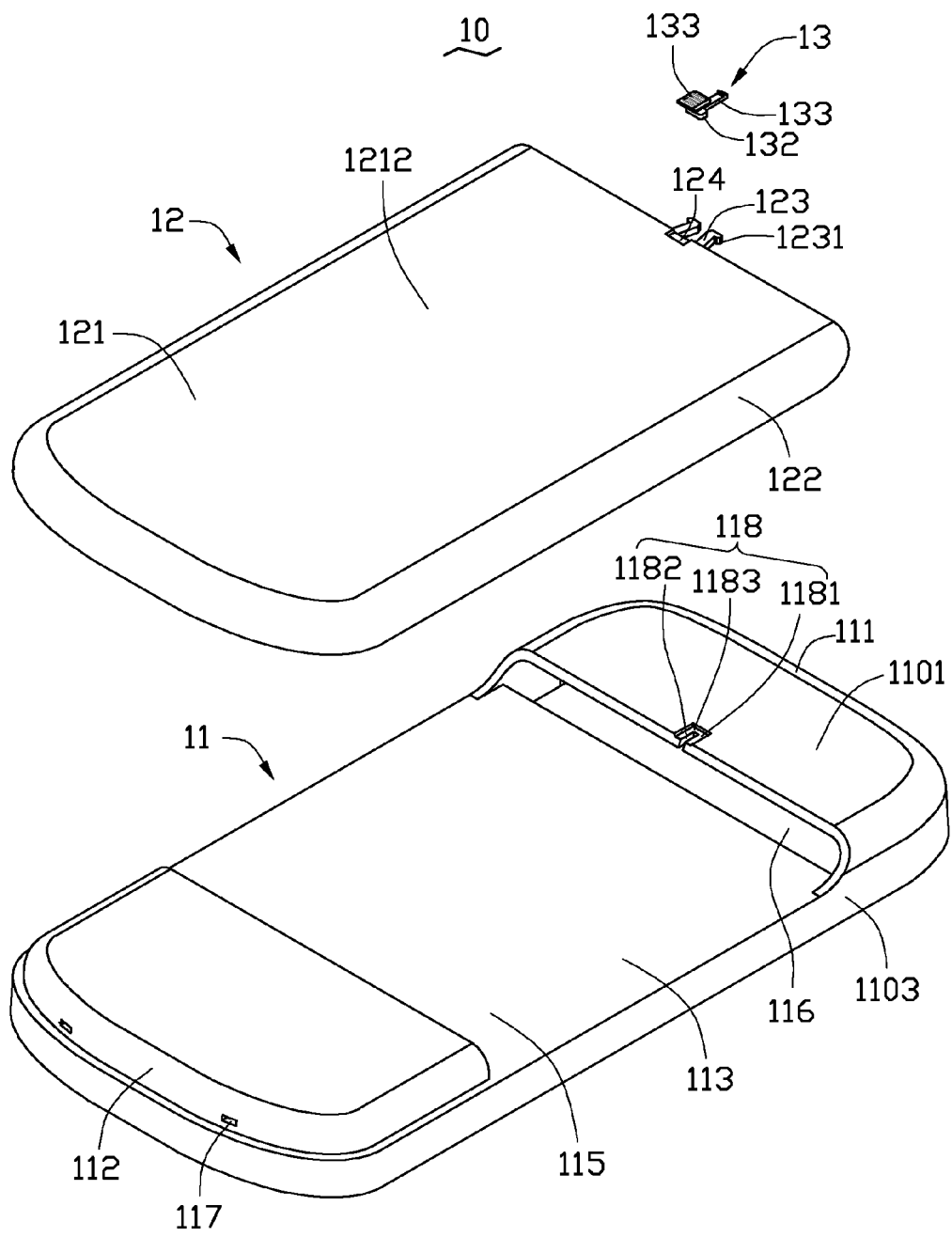
FIG. 1 is an exploded, isometric view of a battery cover latching mechanism, in accordance with an exemplary embodiment.
Figure 2:
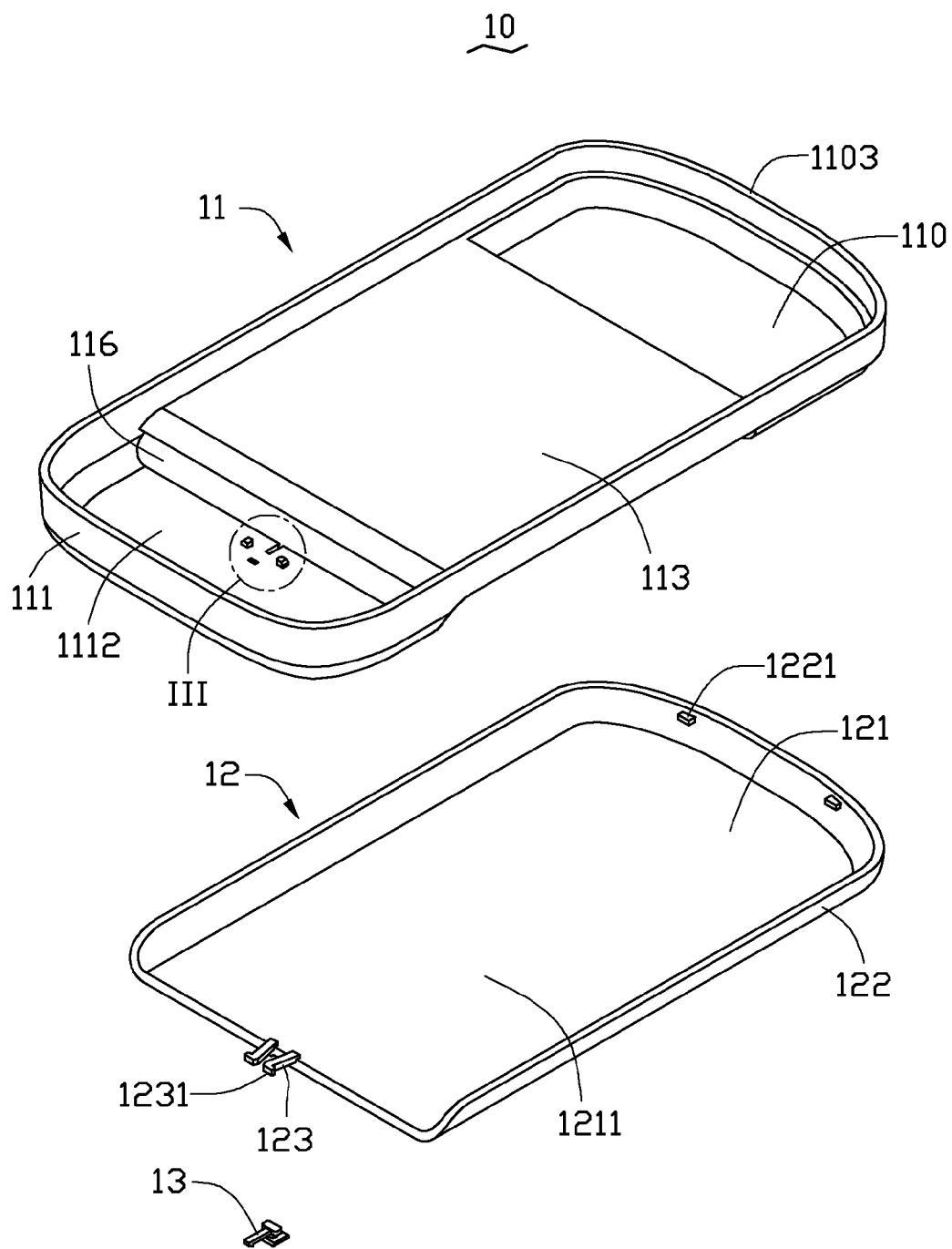
FIG. 2 is similar to FIG. 1, but viewed from another aspect.
Figure 3:
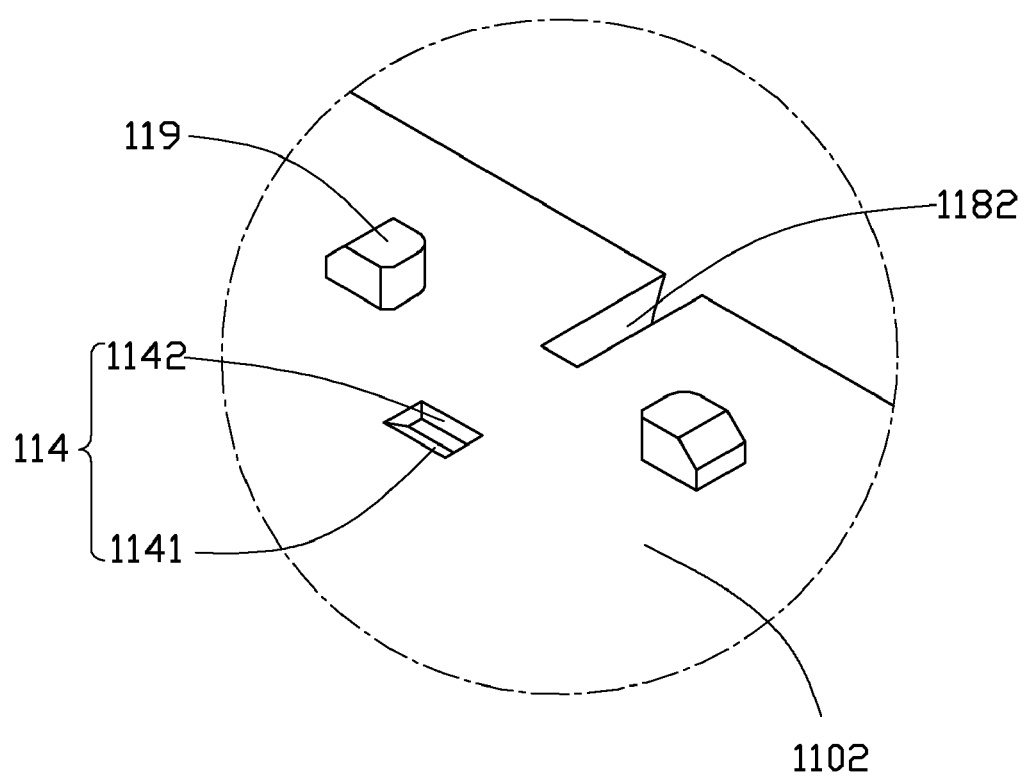
FIG. 3 is a partially enlarged view of the battery cover latching mechanism of FIG. 1.

FIGS. 1 through 3 show an exemplary battery cover latching mechanism 10 including a body member 11, a battery cover 12, and a button 13. The battery cover 12 is assembled on the body member 11. The button 13 is slidably mounted to the body member 11, and used to releasably lock the battery cover 12 to the body member 11.

The body member 11 can be a housing of a portable electronic device. The body member 11 includes a base wall 110 and a peripheral wall 1103 substantially vertically extending from a peripheral edge of the base wall 110. The base wall 110 includes an outer surface 1101 and an inner surface 1102. A middle portion of the outer surface 1101 of the base wall 110 recesses towards the inner surface 1102 of the base wall 110 to form a battery receiving space 115, thus dividing the base wall 110 into two opposite base wall portion 111, 112 and a clapboard 113, and defining an aperture 116 between the base wall portion 111 and the clapboard 113. The base wall portion 112 defines two limiting slots 117 at one end thereof, used to latch with a part of the battery cover 12. The base wall portion 111 has a button mounting compartment 118 formed therein. The button mounting compartment 118 includes a first sliding slot 1181 and an inserting slot 1182 communicating with the first sliding slot 1181. The first sliding slot 1181 is recessed from the outer surface 1101, thus forming a bottom wall 1183. The inserting slot 1182 is defined through the bottom wall 118. The base wall portion 111 has two latching blocks 119 protruding from the inner surface 1102 and locating at two opposite sides of the inserting slot 1182, adjacent to the aperture 116. The base wall portion 111 has a latching slot 114 defined in the inner surface 1102 an extending in a longitudinal direction relative to the inserting slot 1182. The latching slot 114 is surrounded by a first guiding surface 1141 and a first stopping surface 1142 opposite to the first guiding surface 1141. The first guiding surface 1141 is slope, and away from the inserting slot 1182.

The battery cover 12 is used to be assembled on the body member 11, and cover the battery receiving space 115. The battery cover 12 includes a main board 121 and a peripheral wall 122 formed by bending the edge of the main board 121. The battery cover 12 has two limiting blocks 1221 protruding from the peripheral wall 122, corresponding to the limiting slots 117. The main board 121 includes an interior surface 1211 and an exterior surface 1212. Two elastic clamps 123 protrude from one side of the interior surface 1211 away from the limiting blocks 1221. A free end of each clamp 123 includes a clamping portion 1231. A distance between the two clamps 123 decreases from the interior surface 1211 to the clamping portions 1231. The exterior surface 1212 defines a second sliding slot 124 adjacent to the clamps 123. The first sliding slot 1181 is aligned with the second sliding slot 124.

Figure 4:
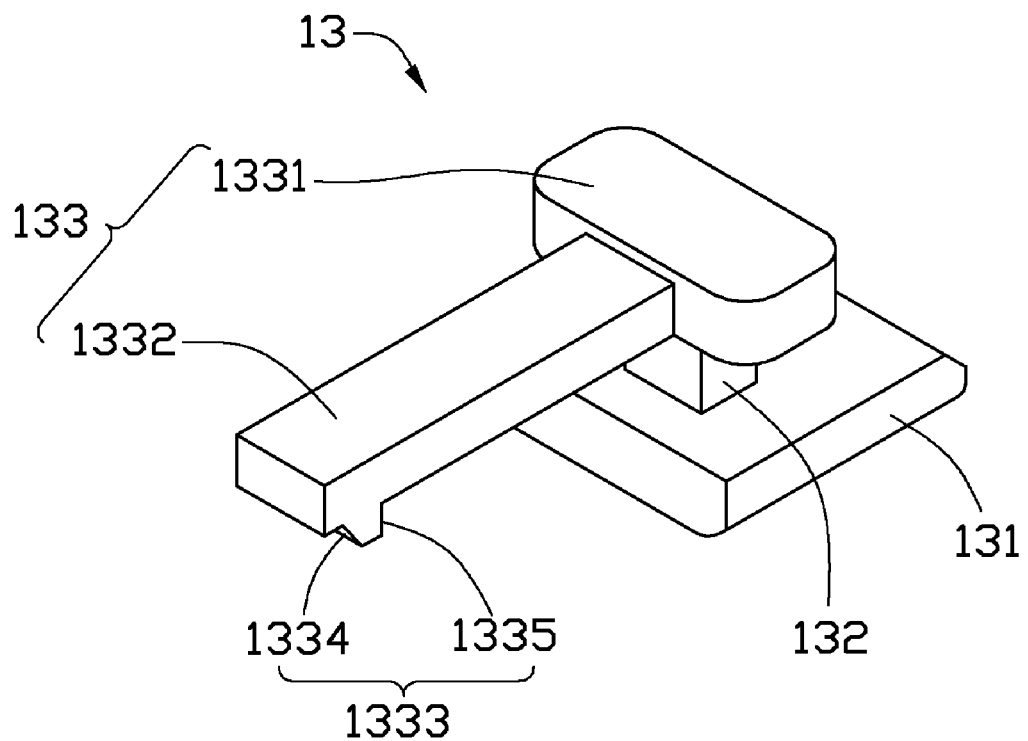
FIG. 4 is an isometric view of the button shown in FIG. 2.

Referring to FIG. 4, the button 13 includes an operating portion 131, a connecting portion 132, and a resisting portion 133. The connecting portion 132 is block-shaped and protrudes from a middle portion of the operating portion 131. The connecting portion 132 connects the operating portion 131 and the resisting portion 133. The connecting portion 132 is slidably positioned in the inserting slot 1182. The operating portion 131 is slidably received in the first sliding slot 1181 and the second sliding slot 124. The resisting portion 133 includes a resisting block 1331 and a latching arm 1332 protruding from the resisting block 1331. The resisting block 1331 is formed at the connecting portion 132 and has a cross-section larger than that of the connecting portion 132. The latching arm 1332 extends a predetermined distance from one side of the resisting block 1331. The latching arm 1332 has a hook 1333 formed at distal end thereof away from the resisting block 1331. Two opposite sides of the resisting block 1331 respectively resist a clamp 123. The hook 1333 is clamped into the latching slot 114. The hook 1333 includes a second guiding surface 1334 and a second stopping surface 1335 opposite to the second guiding surface 1334. The second guiding surface 1334 is a slope and corresponds to the first guiding surface 1141. The second stopping surface 1335 corresponds to the first stopping surface 1142.

Figure 5:
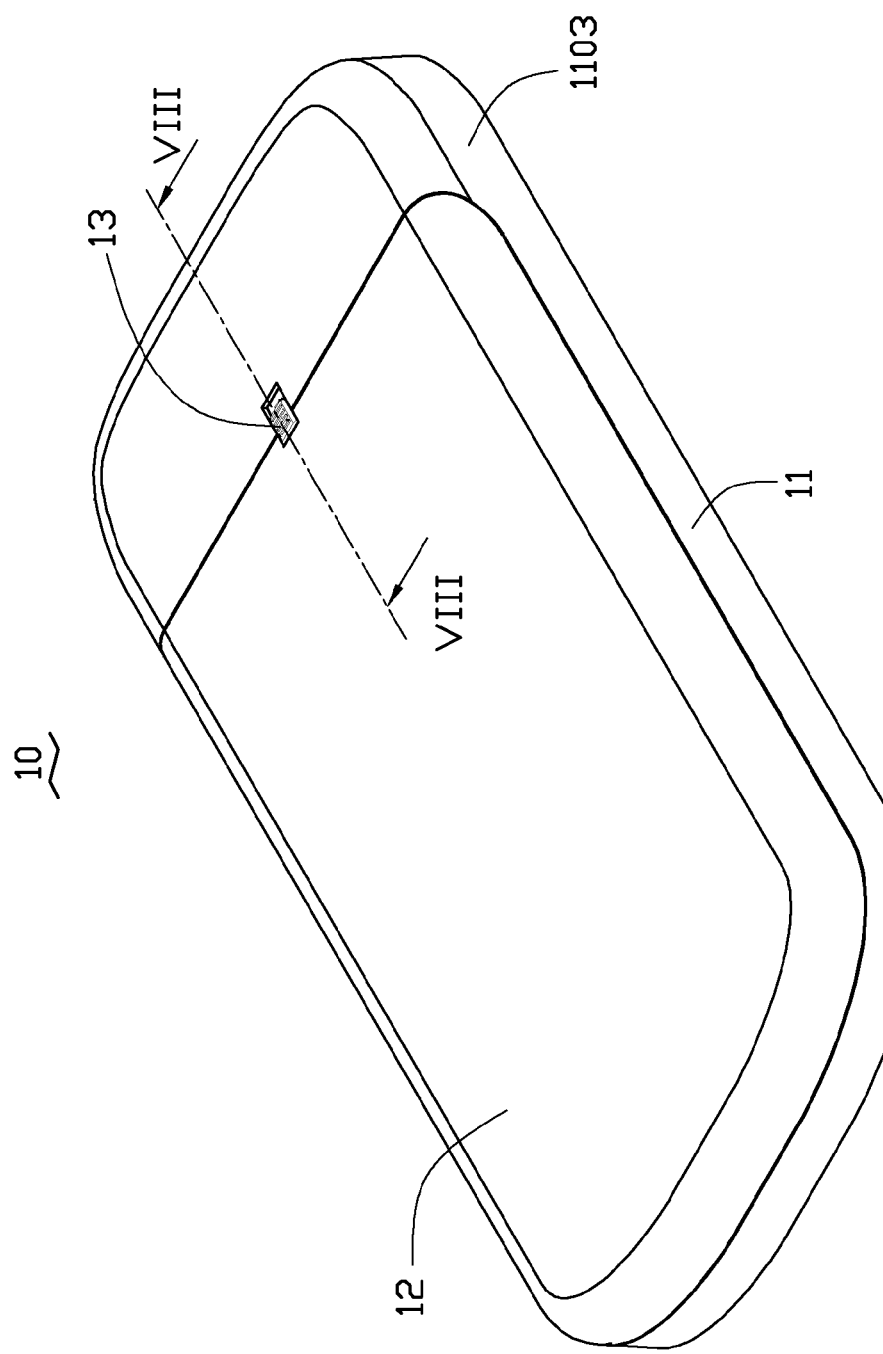
FIG. 5 is an assembled view of the battery cover latching mechanism shown in FIG. 4.
Figure 6:
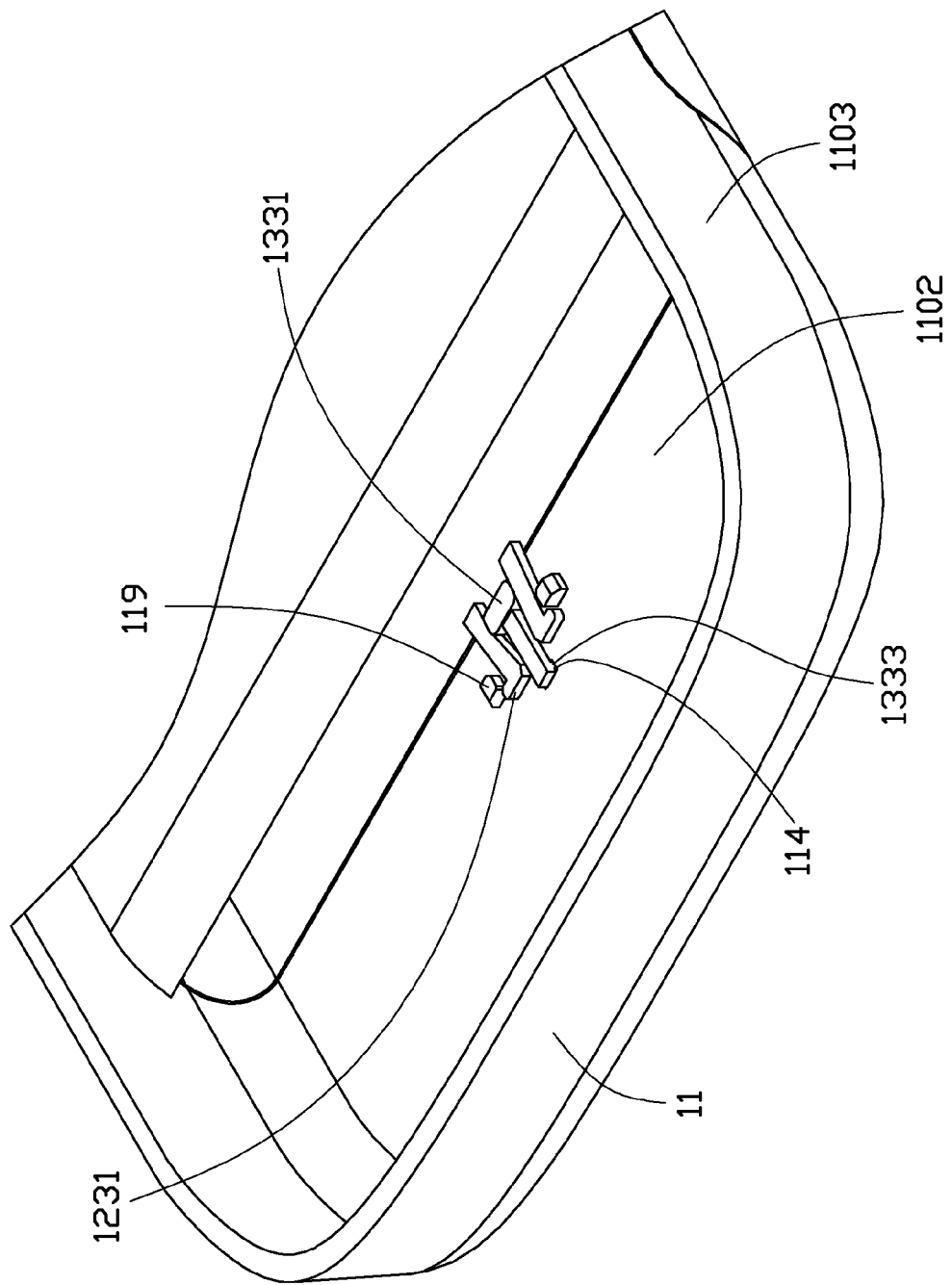
FIG. 6 is similar to FIG. 5, but viewed from another aspect.
Figure 8:
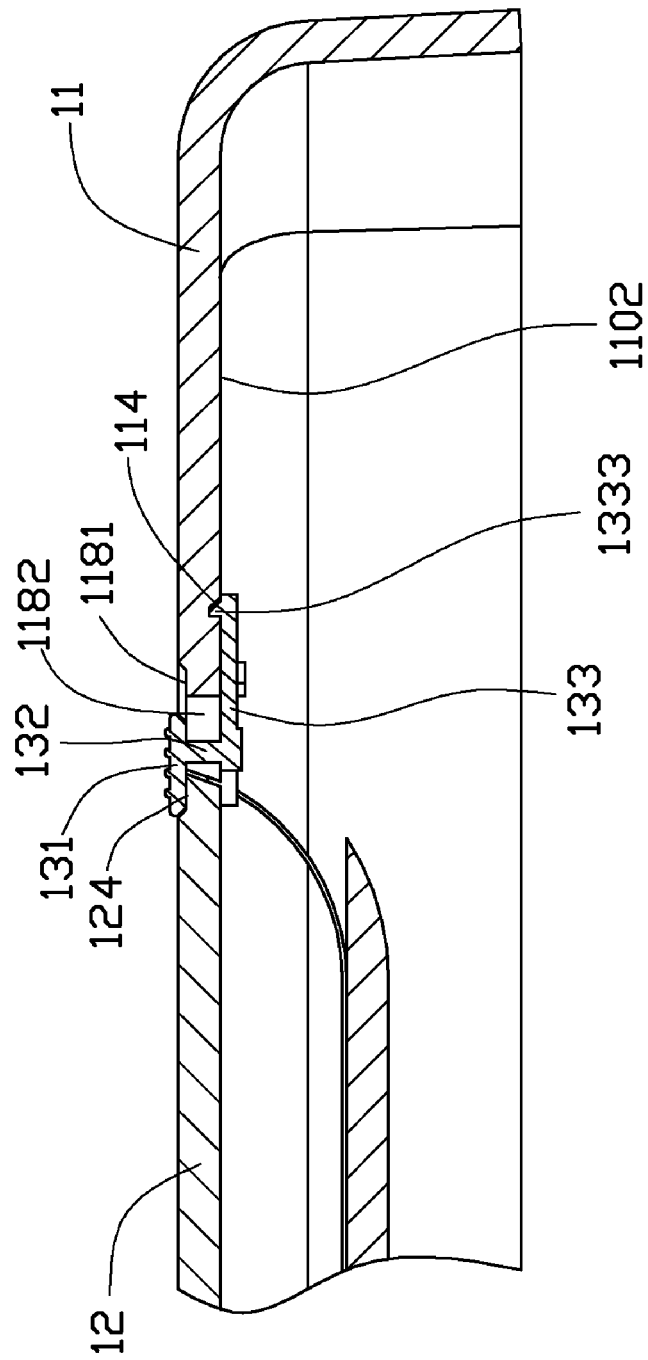
FIG. 8 is a cross-sectional view of the battery cover latching mechanism shown in FIG. 4.

Referring to FIGS. 5, 6 and 8 together, in assembly, the connecting portion 132 of the button 13 is slidably inserted into the inserting slot 1182. The operating portion 131 of the button 13 is partially received in the first sliding slot 1181, at this time, the resisting portion 133 elastically resists the inner surface 1102. The hook 1333 is hooked into the latching slot 114, thus mounting the button 13 to the body member 11.

To mount the battery cover 12 to the body member 10, the battery cover 12 is generally assembled on the battery receiving space 115, with the two clamps 123 attaching to the inner surface 1102. At this time, the two clamps 123 are located between the two latching blocks 119, and cooperatively clamp the resisting block 1331 therebetween. The operating portion 131 is partially received in the second sliding slot 124. Each limiting block 1221 is latched into a corresponding limiting slot 117, and the button 13 is located at a first position. The operating portion 131 is pushed towards the first sliding slot 1181. The hook 1333 is slid out of the latching slot 114 guided by the first guiding surface 1141 and the second guiding surface 1334. Thus, the resisting block 1331 pushes the two latching portions 1231 towards the latching blocks 119 until the latching portions 1231 each latch on one corresponding latching block 119. At this time, the button 13 is located at a second position, and the hook 1333 tightly resists the inner surface 1102, thus stably latching the battery cover 12 to the body member 11.

Figure 7:
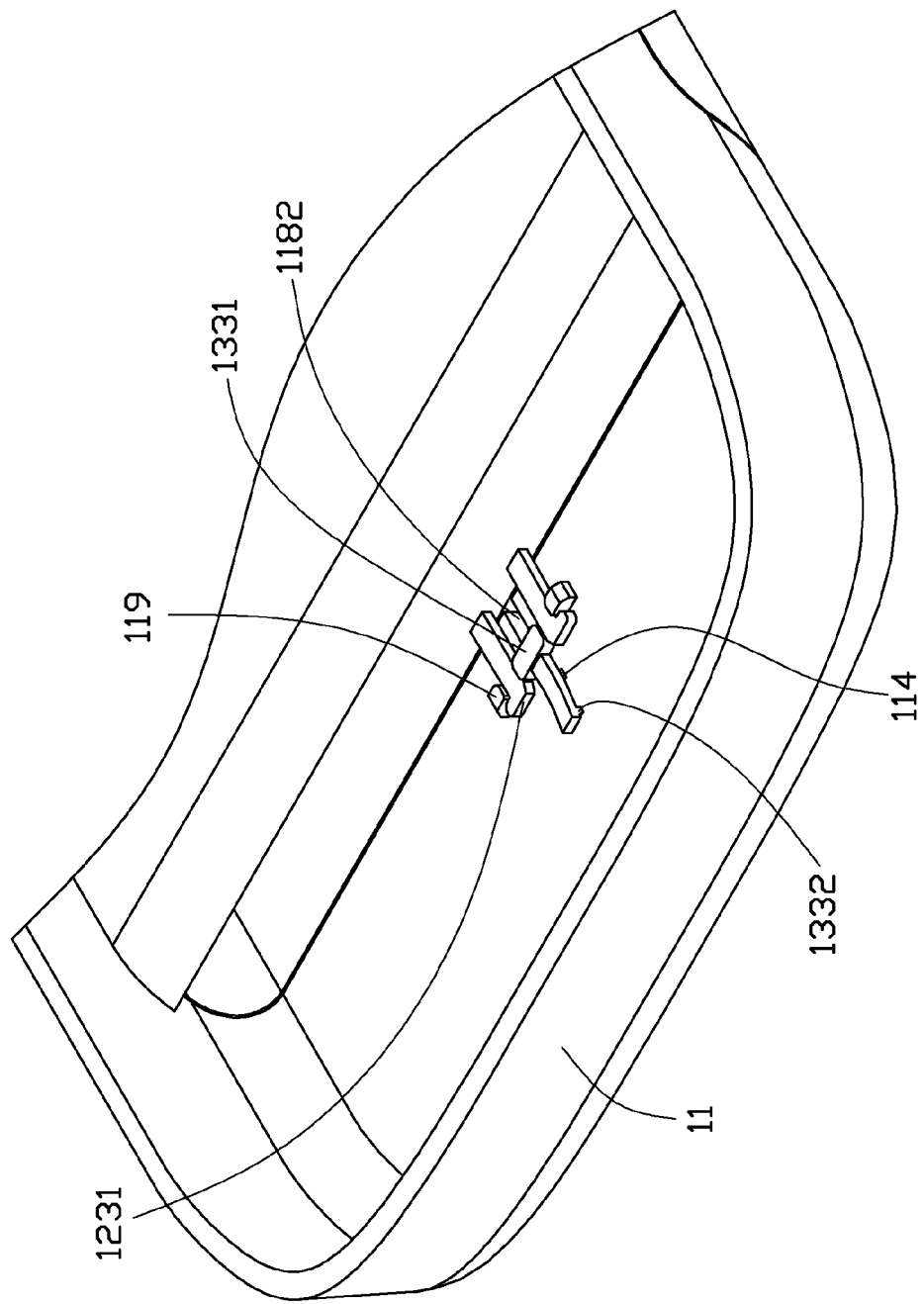
FIG. 7 is a schematic view, showing the working status of the battery cover latching mechanism shown in FIG. 6.

Referring to FIG. 7, to release the battery cover 12 from the body member 11, the operating portion 131 is pushed to slide towards the second sliding slot 124 until the hook 1333 is slid into the latching slot 114 guided by the first guiding surface 1141 and the second guiding surface 1334. At this time, the resisting block 1331 slides to a distal end away from the latching portion 1231 of the clamp 123. Thus, the resisting block 1331 is released from between the two latching portions 1231, and the latching portion 1231 is released from the latching blocks 119, and the limiting blocks 1221 are disengaged from the limiting slots 117.

It is to be understood, the number of the clamps 123 can be one, correspondingly, the number of the latching block 119 can be one.

The present battery cover latching mechanism 10 releases the clamp 123 and the latching block 119 by sliding the button 13. Thus, it's convenient for operating. Furthermore, the battery cover 12 cannot be easily disengaged from the body member 11 when a mobile phone incorporating same is dropped, e.g., from a desk.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A battery cover latching mechanism, comprising:
a body member defining a battery receiving space, the body member further including two latching blocks,
a battery cover being placed on the body member to cover the battery receiving space, the battery cover including two clamps; and
a button mounted on the body member, each clamp located between one of the two latching blocks and the button, the button resisting the two clamps and sliding between a first position and a second position, wherein when the button is at the first position, the two clamps are released from the two latching blocks, when the button is in the second position, the button resists the two clamps to move towards the two latching blocks and then latch with the two latching blocks;
wherein a distance between the two clamps decreases from the battery cover to the two latching blocks.

2. The battery cover latching mechanism as claimed in claim 1, wherein the button includes a resisting portion, the resisting portion is located between the two clamps, and resists the two clamps towards the two latching blocks.

3. The battery cover latching mechanism as claimed in claim 2, wherein the button includes an operating portion, a connecting portion, and a resisting portion, the connecting portion connects the operating portion and the resisting portion, the body member further defines an inserting slot, the connecting portion is received in the inserting slot, the resisting portion elastically clamps on the body member.

4. The battery cover latching mechanism as claimed in claim 3, wherein the resisting portion includes a resisting block and a hook, and the hook protrudes from the resisting block, two opposite sides of the resisting block respectively resist the two clamps, the body member defines a latching slot, the hook is clamped into the latching slot.

5. The battery cover latching mechanism as claimed in claim 4, wherein the latching slot is surrounded by a first guiding surface and a first stopping surface opposite to the first guiding surface, the hook includes a second guiding surface and a second stopping surface opposite to the second guiding surface, the second guiding surface match with the first guiding surface, the second stopping surface resists the first stopping surface.

6. The battery cover latching mechanism as claimed in claim 5, wherein the body member defines limiting slots, the battery cover includes limiting blocks corresponding to the limiting slots, the limiting blocks latch into the limiting slots.

7. The battery cover latching mechanism as claimed in claim 3, wherein the body member defines a first sliding slot, the operating portion is received in the first sliding slot.

8. A battery cover latching mechanism, comprising:
a body member including two latching blocks,
a battery cover placed on the body member, and including two clamps; and
a button mounted on the body member, each clamp located between one of the two latching blocks and the button, the button resisting the two clamps and sliding between a first position and a second position, when the button is at the first position, the two clamps are released from the two latching blocks, when the button is in the second position, the button resists the two clamps to move towards the and then latch with the two latching blocks;
wherein a distance between the two clamps decreases from the battery cover to the two latching blocks.

9. The battery cover latching mechanism as claimed in claim 8, wherein the button includes a resisting portion, the resisting portion is located between the two clamps, and resists the two clamps towards the two latching blocks.

10. The battery cover latching mechanism as claimed in claim 9, wherein the resisting portion includes a resisting block and a hook, and the hook protrudes from the resisting block, two opposite sides of the resisting block respectively resist the two clamps, the body member defines a latching slot, the hook is clamped into the latching slot.

11. The battery cover latching mechanism as claimed in claim 10, wherein the latching slot is surrounded by a first guiding surface and a first stopping surface opposite to the first guiding surface, the hook includes a second guiding surface and a second stopping surface opposite to the second guiding surface, the second guiding surface is a slope and corresponds to the first guiding surface, the second stopping surface corresponds to the first stopping surface.

12. The battery cover latching mechanism as claimed in claim 8, wherein the button includes an operating portion, a connecting portion, and a resisting portion, the connecting portion connects the operating portion and the resisting portion, the body member further defines an inserting slot, the connecting portion is received in the inserting slot, the resisting portion elastically clamps on the body member.

13. The battery cover latching mechanism as claimed in claim 12, wherein the body member defines a first sliding slot, the operating portion is received in the first sliding slot.

14. The battery cover latching mechanism as claimed in claim 13, wherein the body member defines limiting slots, the battery cover includes limiting blocks corresponding to the limiting slots, the limiting blocks latch into the limiting slots.

* * * * *